(12) United States Patent
Althöfer et al.

(10) Patent No.: US 7,412,873 B2
(45) Date of Patent: Aug. 19, 2008

(54) METHOD FOR POSITIONING A MEASURING SENSOR IN A HONEYCOMB BODY, CORRESPONDING HONEYCOMB BODY, AND MOTOR VEHICLE

(75) Inventors: Kait Althöfer, Wiehl (DE); Rolf Brück, Bergisch Gladbach (DE); Peter Hirth, Rösrath (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 11/837,578

(22) Filed: Aug. 13, 2007

(65) Prior Publication Data

US 2008/0011054 A1  Jan. 17, 2008

Related U.S. Application Data

(63) Continuation of application No. PCT/EP2006/001243, filed on Feb. 10, 2006.

(30) Foreign Application Priority Data

Feb. 11, 2005  (DE) .................. 10 2005 006 262

(51) Int. Cl.
  *G01N 7/02* (2006.01)
(52) U.S. Cl. .................................... 73/23.31
(58) Field of Classification Search .............. 73/23.31
  See application file for complete search history.

(56) References Cited

U.S. PATENT DOCUMENTS

| 7,056,474 B2 * | 6/2006 | Dumas et al. ............ 422/98 |
| 2005/0022382 A1 | 2/2005 | Bruck et al. |
| 2005/0268788 A1 | 12/2005 | Kaiser |
| 2006/0039837 A1 | 2/2006 | Bruck et al. |
| 2006/0130462 A1 * | 6/2006 | Wancura ............... 60/286 |

FOREIGN PATENT DOCUMENTS

| DE | 88 16 154.4 U1 | 2/1989 |
| DE | 103 00 408 A1 | 7/2004 |
| DE | 103 11 235 A1 | 10/2004 |
| EP | 1 227 234 A2 | 7/2002 |

* cited by examiner

*Primary Examiner*—Michael Cygan
(74) *Attorney, Agent, or Firm*—Laurence A. Greenberg; Werner H. Stemer; Ralph E. Locher

(57) ABSTRACT

A method positions a sensor in a honeycomb body which is provided with hollow spaces that can be penetrated at least in part by an exhaust gas. The sensor is placed in an area of the honeycomb body in which at least one minimum hydrogen concentration occurs when the honeycomb body is operated in the emission system of a motor vehicle. The sensor positioning method allows the sensor to be placed in the honeycomb body in such a way that systematic errors that occur are kept as small as possible as a result of an inherent transverse sensitivity of the sensor to hydrogen. This applies especially to lambda probes. A honeycomb body contains the sensor which is placed so as to supply particularly reliable test data whose systematic error is as small as possible.

18 Claims, 2 Drawing Sheets

METHOD FOR POSITIONING A MEASURING SENSOR IN A HONEYCOMB BODY, CORRESPONDING HONEYCOMB BODY, AND MOTOR VEHICLE

CROSS-REFERENCE TO RELATED APPLICATIONS

This is a continuing application, under 35 U.S.C. § 120, of copending international application PCT/EP2006/001243, filed Feb. 10, 2006, which designated the United States; this application also claims the priority, under 35 U.S.C. § 119, of German patent application DE 10 2005 006 262.8, filed Feb. 11, 2005; the prior applications are herewith incorporated by reference in their entirety.

BACKGROUND OF THE INVENTION

1. Field of the Invention

The subject matter of the present invention is a method for positioning a measuring sensor, in particular a lambda probe, in a honeycomb body, a corresponding honeycomb body, and a motor vehicle which contains a corresponding honeycomb body. Honeycomb bodies are used in particular as catalytic converter support bodies or filter bodies in the exhaust system of motor vehicles such as for example automobiles or motorized two-wheelers.

Honeycomb bodies are used as catalytic converter support bodies and/or filter bodies in exhaust systems, in particular of automobiles, motorized two-wheelers, quadbikes, boats or aircraft, and have cavities which can be at least partially traversed by a fluid, in particular an exhaust gas. The exhaust systems often also have measuring sensors such as lambda probes and/or control probes, which can preferably also be formed in a honeycomb body, as is presented for example in German Utility Model DE 88 16 154 U1. International patent disclosure WO 02/075126 A1, for example, discloses a method by which, in the case of a honeycomb body which has a honeycomb structure which is constructed from metallic layers and contains the cavities, a measuring sensor can be inserted such that the least possible surface losses occur for example for a catalytically active coating. In the case of a honeycomb body which contains a ceramic honeycomb structure, various methods are known for forming a cavity in the honeycomb structure for receiving the measuring sensor, for example boring a hole into the honeycomb structure.

In all of the methods, however, it was until now unclear where the measuring sensor must be positioned in order to ensure a measurement result of the measuring sensor which is as free as possible from systematic errors.

SUMMARY OF THE INVENTION

It is accordingly an object of the invention to provide a method for positioning a measuring sensor in a honeycomb body, corresponding honeycomb body, and a motor vehicle which overcomes the above-mentioned disadvantages of the prior art devices and methods of this general type, in which method the measuring sensor is positioned such that possible systematic errors based on the position of the measuring sensor in the honeycomb body are kept as low as possible. It is also intended to propose a corresponding honeycomb body and a motor vehicle having a corresponding honeycomb body.

In the method according to the invention for positioning a measuring sensor in a honeycomb body which has cavities which can be at least partially traversed by an exhaust gas, the measuring sensor is positioned in a region of the honeycomb body in which, in operation of the honeycomb body in the exhaust system of a motor vehicle, at least a minimum of the hydrogen concentration is present.

It has been proven that in particular lambda probes are sensitive to the surrounding hydrogen concentration, that is to say that the measurement result delivered by the probe is highly dependent on the surrounding hydrogen concentration. In order to keep a systematic error of the type as small as possible, and in particular to keep a fluctuation of the systematic error of the measurement result with time as low as possible, it is proposed according to the invention to place the measuring sensor in the region of the hydrogen minimum. The presence of such a minimum is based on the multiplicity of chemical reactions which take place in parallel in particular in a honeycomb body which is used as a catalytic converter support body. In addition to reactions in which hydrogen is consumed, for example in the case of the oxidation of oxygen or in the case of the reduction of nitrogen oxide, reactions also take place as a result of which hydrogen is generated, such as for example the shift reaction in which carbon dioxide (CO) and water ($H_2O$) are converted to form carbon dioxide ($CO_2$) and hydrogen ($H_2$), or also the water vapor reformer reaction.

The positioning of the measuring sensor in the minimum of the hydrogen concentration advantageously leads to the systematic error resulting from the cross-sensitivity of the measuring sensor to hydrogen being kept as low as possible. It has surprisingly been shown that even a positioning of the measuring sensor slightly offset with respect to the hydrogen concentration minimum leads to a considerable reduction in the systematic error, so that not only a positioning of the measuring sensor at the minimum but also in a region around the minimum is advantageous and within the spirit of the invention.

The position of the minimum is preferably determined while the honeycomb body is subjected to a standard emissions test such as for example the EU Evaporative Emissions Test (SHED 2000), the EU Type Approval Test "Type IV" or the US Federal Test Procedure. Predefined in the tests are precise test cycles and details such as for example the temperature of the fuel, the composition of the fuel, vehicle speed and the like.

In this application, a motor vehicle is to be understood in particular to mean an automobile, a motorized two-wheeler or quadbike, a boat or an aircraft. The hydrogen concentration is to be understood in particular to mean an axial hydrogen concentration, in which in particular the hydrogen concentration is averaged in a radial direction. The honeycomb body can be in particular a catalytic converter support body and/or a filter body such as an open particle filter or a diesel particle filter, in particular with alternately closed-off ducts. The honeycomb body can encompass a honeycomb structure, which contains or forms the cavities, in a casing tube.

The position of the measuring sensor is to be understood in particular to mean the position of a line of symmetry or of an edge of the measuring sensor. A measuring sensor is to be understood here in particular to mean a lambda probe, a control probe, a temperature sensor and/or a gas concentration sensor, for example for determining the concentration of hydrocarbons or nitrogen oxides.

According to one advantageous embodiment of the method according to the invention, the region extends around the position of the minimum in the axial direction in each case by substantially 10% of an axial length of the honeycomb body.

Therefore the measuring sensor is formed both in one partial region with a length of substantially 10% of the axial length of the honeycomb body in one direction, and also in a further partial region with a length of substantially 10% of the length of the honeycomb body in a direction which opposes the first direction. In the case of several minima of the hydrogen concentration, consideration is given in particular to the lowest minimum in the range.

According to a further advantageous embodiment of the method according to the invention, the measuring sensor is formed in a region from substantially 20 to 60 mm (millimeter), preferably 30 to 40 mm downstream of an end side, in particular of a gas-inlet-side end side, of the honeycomb body.

Many honeycomb bodies have a preferred throughflow direction which is predefined for example by the construction of flow-influencing structures in the cavities, so that even in the case of a honeycomb body which is not installed in an exhaust system, it is possible to refer to a gas inlet side. Surprisingly, in the case of a large number of honeycomb bodies, a minimum of the hydrogen concentration is situated in the region from substantially 20 to 60 mm, preferably 30 to 40 mm downstream of a gas-inlet-side end side of the honeycomb body.

According to a further advantageous embodiment of the method according to the invention, the position of the minimum is determined in an EU Evaporative Emissions Test (SHED 2000), in an EU Type Approval Test "Type IV" or in a US Federal Test Procedure. Other test methods are however possible and within the spirit of the invention.

According to a further advantageous embodiment of the method according to the invention, the method serves for positioning at least one of the following measuring sensors:
 a) lambda probe or
 b) control probe.

A control probe is to be understood to mean a measuring sensor which is part of a closed-loop control circuit. A control probe can encompass the functionality of a lambda probe or can be a lambda probe, with it also being possible for further or other functions to be carried out by the control probe. For example, a control probe can comprise a temperature sensor and/or a gas concentration sensor, for example for determining the concentration of hydrocarbons or nitrogen oxides.

According to a further advantageous embodiment of the method according to the invention, the minimum is an absolute minimum.

It is possible depending on the operating parameters of the honeycomb body for a plurality of minima of the hydrogen concentration to occur, so that the measuring sensor is preferably formed in the region of an absolute hydrogen concentration minimum.

According to a further aspect of the concept according to the invention, a honeycomb body having cavities which can be at least partially traversed by an exhaust gas, and containing a measuring sensor, is proposed, in which the measuring sensor is formed in a region in which, in operation of the honeycomb body in the exhaust system of a motor vehicle, at least one minimum of a hydrogen concentration is present.

The formation of the measuring sensor in the region of the minimum results in the lowest possible systematic error on account of the cross-sensitivity of the measuring sensor to hydrogen. It is preferable for the measuring sensor to be embodied as a lambda probe or control probe. The minimum is determined using known test methods such as for example the EU Evaporative Emissions Test (SHED 2000), the EU Type Approval Test "Type IV" or the US Federal Test Procedure. The position of the measuring sensor is preferably determined according to one of the above-stated methods.

According to a further advantageous embodiment of the honeycomb body according to the invention, the region extends around the position of the minimum in the axial direction in each case by substantially 10% of an axial length of the honeycomb body.

According to a further advantageous embodiment of the honeycomb body according to the invention, the measuring sensor is formed in a region from substantially 20 to 60 mm, preferably 30 to 40 mm downstream of an end side, in particular of a gas-inlet-side end side, of the honeycomb body.

According to a further advantageous embodiment of the honeycomb body according to the invention, the measuring sensor contains at least one of the following measuring probes:
 a) lambda probe or
 b) control probe.

According to a further advantageous embodiment of the honeycomb body according to the invention, the region contains an absolute minimum of the hydrogen concentration.

According to a further advantageous embodiment of the honeycomb body according to the invention, the honeycomb body contains an at least partially ceramic and/or metallic honeycomb structure.

Here, the honeycomb structure can be constructed as a ceramic monolith, if appropriate with inserts made from for example metal. The honeycomb structure can also be constructed from at least partially structured and if appropriate substantially smooth layers, by virtue of for example an at least partially structured layer being wound in spiral fashion or for example at least one stack of substantially smooth and at least partially structured layers being wound. The layers can comprise metal sheet layers, fibrous layers, in particular fibrous layers made from ceramic and/or metallic fibers, other porous layers, in particular metallic and/or ceramic porous layers, and mixtures and/or combinations of the above. The honeycomb structure can for example be extruded, constructed by rapid prototyping techniques or coiled or wound. All coiling, winding and extrusion techniques are possible and within the spirit of the invention.

Also proposed is a motor vehicle which contains at least one honeycomb body according to the invention. A motor vehicle is to be understood in this context to mean in particular an automobile, a motorized two-wheeler or quadbike, a boat or an aircraft.

This is to mean in particular a motor vehicle having an exhaust system in which is disposed at least one exhaust gas purification component comprise a honeycomb body of the type. The exhaust system generally contains an internal combustion engine (for example a diesel or a spark-ignition engine) in which exhaust gases are generated, and an exhaust line through which the exhaust gases are conducted in a flow direction and brought into contact with at least one exhaust gas purification component (for example catalytic converter, filter, particle separator, adsorber, etc.), which is disposed in the exhaust line, for converting or separating harmful substances. Here, at least one of the exhaust gas purification components is formed with a honeycomb body of the above-specified type. The configuration of the at least one measuring sensor is preferably carried out such that the position for the desired exhaust system is determined by test procedures and/or by calculation (for example with computerized assistance).

All of the advantages and details which have been disclosed for the method according to the invention can be transferred and applied to a honeycomb body according to the invention and to a motor vehicle according to the invention, and in each case vice versa.

Other features which are considered as characteristic for the invention are set forth in the appended claims.

Although the invention is illustrated and described herein as embodied in a method for positioning a measuring sensor in a honeycomb body, corresponding honeycomb body, and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
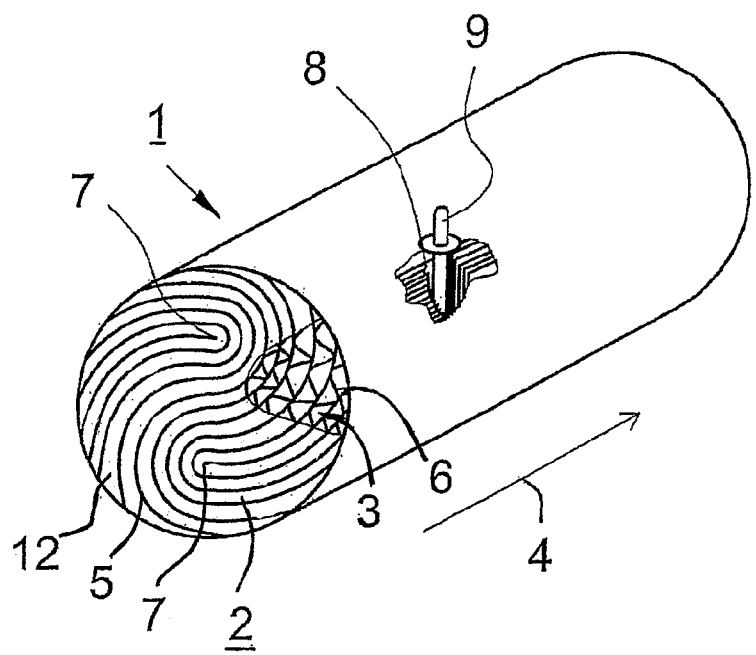
FIG. 1 is a perspective view of a first exemplary embodiment of a honeycomb body according to the invention.

Referring now to the figures of the drawing in detail and first, particularly, to FIG. 1 thereof, there is shown a first exemplary embodiment of a honeycomb body 1 according to the invention. The latter contains a honeycomb structure 2 having cavities 3 which can be at least partially traversed by a fluid and which extend in an axial direction 4 of the honeycomb body 1. The cavities 3 are formed by substantially smooth layers 5 and at least partially structured layers 6. The at least partially structured layers 6, which are shown in only a part of the cross section of the honeycomb structure 2 for reasons of clarity, are corrugated. "Substantially smooth" in this context means that the substantially smooth layer 5 can also have structures, whose amplitude is however smaller, preferably significantly smaller, than the structures in the at least partially structured layer 6. In the present exemplary embodiment, the layers 5, 6 have been stacked to form a stack, and this has then been wound about two fixed points 7.

The honeycomb structure 2 has a measuring sensor receptacle 8 into which a measuring sensor 9 is inserted. The measuring sensor 9 can be embodied in particular as a lambda probe, a control probe, a temperature sensor and/or a gas concentration sensor, for example for determining the concentration of hydrocarbons or nitrogen oxides. Particularly preferred is a lambda probe which can also be encompassed in a control probe. The measuring sensor 9 is formed at a position which is situated in the region of a minimum of the hydrogen concentration in operation of the honeycomb body 1 in the exhaust system of a motor vehicle. The position of the minimum in the axial direction 4 is determined in one of the above-described tests.

Figure 2:
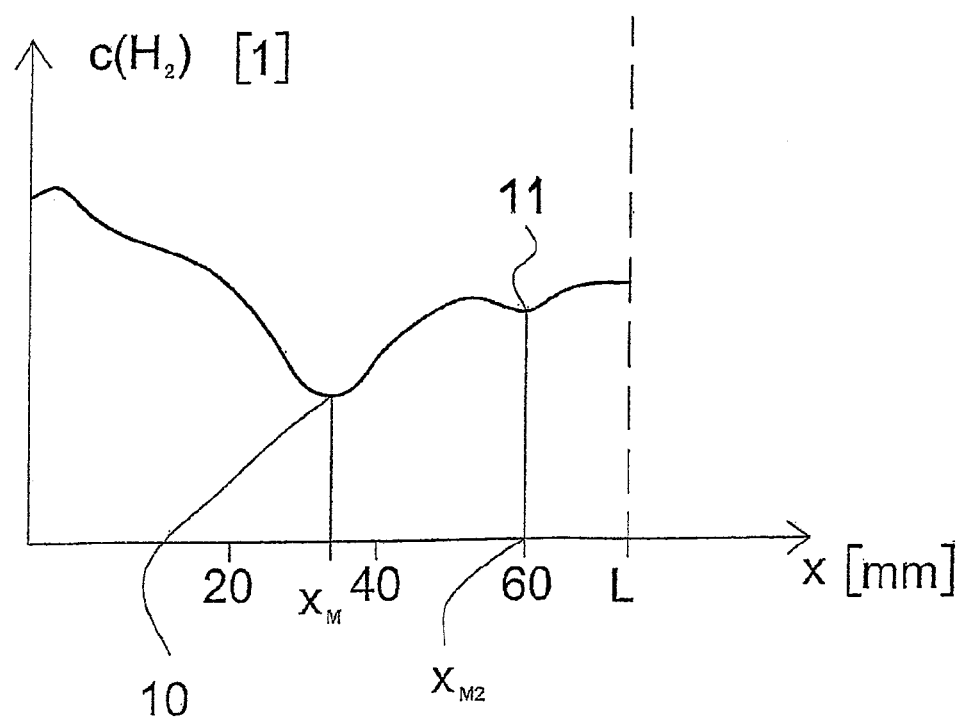
FIG. 2 is a graph showing a profile of a concentration of hydrogen in the honeycomb body according to the invention.

FIG. 2 shows, schematically and by way of example, a profile of the concentration of hydrogen $c(H_2)$ in relative units in a honeycomb body 1 according to the invention. The concentration c is plotted against a coordinate x in the axial direction 4. In this exemplary embodiment, the honeycomb body 1 has a length L of 70 mm. The profile of the concentration c has a first minimum 10 at the minimum coordinate xM. A second minimum 11 of the hydrogen concentration c is present at the second minimum coordinate xM2. The minimum coordinate xM is situated in the region of 30 to 40 mm downstream of an end side 12 of the honeycomb body 1 which, in the concentration profile shown in FIG. 2, is to be found at a coordinate x of zero. The measuring sensor 9 is formed in the region of the minimum coordinate xM of the first minimum 10.

Figure 3:
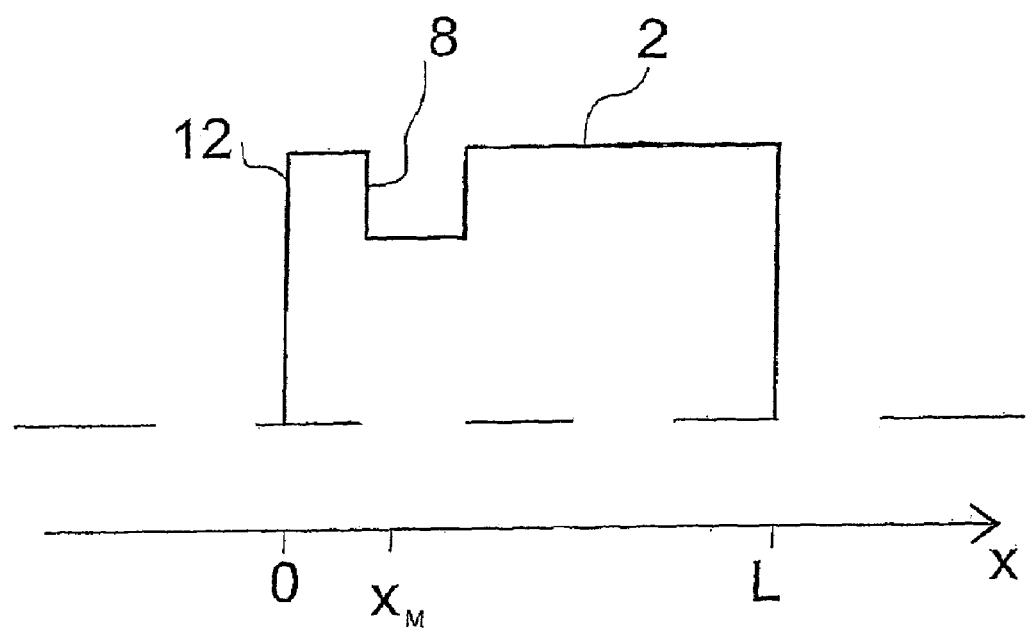
FIG. 3 is a partial, simplified longitudinal sectional view of the honeycomb body according to the invention, with the associated longitudinal axis.

FIG. 3 schematically shows a detail from a longitudinal section of the honeycomb structure 2 of the honeycomb body 1 according to the invention. In this example, the honeycomb structure 2 is formed, for example extruded, monolithically from ceramic material, and has the measuring sensor receptacle 8 for holding the non-illustrated measuring sensor 9. The measuring sensor receptacle 8 and therefore also the measuring sensor 9 are situated in the region of the minimum coordinate xM, with the region preferably extending around the minimum coordinate xM in the axial direction 4, and in the opposite direction, in each case by 10% of the length L of the honeycomb body. The measuring sensor 9 and the measuring sensor receptacle 8 are therefore situated in a region of $xM-L/10<x<xM+L/10$. Here, the position of the measuring sensor 9 can refer both to an edge of the measuring sensor 9 and to an axis of symmetry of the measuring sensor 9. If the measuring sensor 9 enters into the honeycomb structure 2 not perpendicularly with respect to the axial direction 4 but rather at an angle other than 90°, then the measuring sensor 9 is still formed in the specified preferred regions around the minimum coordinate xM, even if only a part of the measuring sensor 9 is formed in the regions.

The method according to the invention for positioning the measuring sensor 9 advantageously makes it possible to position the measuring sensor 9 in the honeycomb body 1 in such a way that occurring systematic errors on account of an existing cross-sensitivity of the measuring sensor 9 to hydrogen are kept as low as possible. This applies in particular to lambda probes. The honeycomb body 1 according to the invention contains the measuring sensor 9 which is positioned so as to deliver particularly reliable measurement data whose systematic error is as low as possible.

The invention claimed is:

1. A method for positioning a measuring sensor in a honeycomb body having cavities to be at least partially traversed by an exhaust gas, which comprises the steps of:
    positioning the measuring sensor in a region of the honeycomb body at which, in operation of the honeycomb body in an exhaust system of a motor vehicle, a minimum of a hydrogen concentration is present.

2. The method according to claim 1, wherein the region extends around a position of the minimum in an axial direction in each case by substantially 10% of an axial length of the honeycomb body.

3. The method according to claim 1, which further comprises positioning the measuring sensor in an area from 20 to 60 mm downstream of an end side of the honeycomb body.

4. The method according to claim 1, which further comprises positioning the measuring sensor in an area from 30 to 40 mm downstream of an end side, of the honeycomb body.

5. The method according to claim 3, wherein the end side is a gas-inlet-side end side of the honeycomb body.

6. The method according to claim 1, which further comprises determining a position of the minimum in an European Union evaporative emissions test SHED 2000, in an European Union type approval test "Type IV" or in a U.S, Federal test procedure.

7. The method according to claim 1, which further comprises selecting the measuring sensor from the group consisting of lambda probes and control probes.

8. The method according to claim 1, which further comprises defining the minimum as an abosute minimum of the hydrogen concentration.

9. A honeycomb body, comprising:
a honeycomb structure having cavities formed therein for being at least partially traversed by an exhaust gas; and
a measuring sensor being disposed in a region of said honeycomb structure at which, in operation of the honeycomb body in an exhaust system of a motor vehicle, at least one minimum of a hydrogen concentration is present.

10. The honeycomb body according to claim 9, wherein said region extends around a position of said minimum in an axial direction in each case by substantially 10% of an axial length of said honeycomb structure.

11. The honeycomb body according to claim 9, wherein said measuring sensor is positioned in an area from substantially 20 to 60 mm downstream of an end side of said honeycomb structure.

12. The honeycomb body according to claim 9, wherein said measuring sensor is positioned in an area 30 to 40 mm downstream of an end side of said honeycomb structure.

13. The honeycomb body according to claim 11, wherein said end side is a gas-inlet-side end side of said honeycomb structure.

14. The honeycomb body according to claim 9, wherein said measuring sensor is selected from the group consisting of lambda probes and control probes.

15. The honeycomb body according to claim 9, wherein said region contains an absolute minimum of the hydrogen concentration.

16. The honeycomb body according to claim 9, wherein said honeycomb structure is an at least partially ceramic honeycomb structure.

17. The honeycomb body according to claim 9, wherein said honeycomb structure is an at least partially metallic honeycomb structure.

18. A motor vehicle, comprising:
a honeycomb body having cavities formed therein to be at least partially traversed by an exhaust gas; and
a measuring sensor being disposed in a region of said honeycomb body at which, in operation of said honeycomb body in an exhaust system of a motor vehicle, at least one minimum of a hydrogen concentration is present.

* * * * *